United States Patent [19]

Olsen et al.

[11] Patent Number: 5,562,828

[45] Date of Patent: Oct. 8, 1996

[54] METHOD AND APPARATUS FOR RECOVERING ACID AND METAL SALTS FROM PRICKLINING LIQUORS

[76] Inventors: Douglas R. Olsen, 58 N. Quaker Hill Rd., Pawling, N.Y. 12564; Daniel E. Bailey, 20 Wilbraham St., Palmer, Mass. 01069

[21] Appl. No.: 447,160

[22] Filed: May 19, 1995

[51] Int. Cl.$^6$ ............................ B01D 15/04; B01D 11/00; B01D 35/18

[52] U.S. Cl. .......................... 210/638; 210/644; 210/649; 210/181; 210/774; 210/195.2; 423/139; 423/140; 62/541

[58] Field of Search .................................. 210/644, 649, 210/651, 638, 805, 195.2, 781, 181, 774, 175; 423/139, 140; 204/151; 62/541, 543, 544

[56] References Cited

U.S. PATENT DOCUMENTS

| | | | |
|---|---|---|---|
| 3,844,927 | 10/1974 | Smith | 204/180 P |
| 3,969,207 | 7/1976 | Kerti et al. | 204/180 P |
| 3,970,738 | 7/1976 | Matsui et al. | 423/140 |
| 4,016,054 | 4/1977 | Gandon et al. | 423/139 |
| 4,177,119 | 12/1979 | Watanabe et al. | 204/151 |
| 5,057,290 | 10/1991 | Peterson et al. | 423/140 |
| 5,064,538 | 11/1991 | Boeteng | 210/644 |

OTHER PUBLICATIONS

Brown, C., "Productivity improvements through recovery of pickle liquors with the APU process", *Iron and Steel Engineer*, Jan. 1990, pp. 55–60.

Brown, C., "Acid/Metal Recovery by Recoflo Sorption," presented at the 23rd Conference of Metallurgists of the CIM, Quebec City, Quebec, Aug. 19–22, 1984, pp. 1–15.

"Final Report Reclamation And Re–Use Of Spent Hydrochloric Acid Hazardous Waste Reduction Grant," *Pace Laboratories, Inc.*, Feb. 14, 1986, pp. 1–44.

Link, W. F., "The Solubility Of Ferrous Sulfate In Sulfuric Acid Solutions", *Soolubilities Inorganic& Metal Compounds*, vol. 1 & 2, 4th Ed., pp. 1047–1051 (1958).

Bailey, D. et al., "Acid Recovery with Diffusion Dialysis" (Nov. 1992), pp. 21 and 23.

Poulsen, D. et al., "The Fine Line Between Waste and Profit" (Dec. 1993), pp. 20–24.

Primary Examiner—Ana Fortuna
Attorney, Agent, or Firm—Kenyon & Kenyon

[57] ABSTRACT

Spent acid contaminated with metal salts in a hot solution removed from a metal pickling bath is directed to one side of an anionic membrane to separate acid ions from the metal salt solution by diffusion dialysis through the membrane. Most of the metal salts in the remaining low acidity mother liquor are crystallized by refrigerating the mother liquor. The crystals are dewatered (in a centrifuge, for example) to produce a commercially viable noncorrosive byproduct, and the substantially decontaminated mother liquor is directed to the opposite side of the diffusion membrane, where it receives the acid ions diffusing through the membrane, and is then recycled to the pickling bath. Heat interchange between the hot spent acid solution and the recycled acid lowers the temperature of the spent acid to an optimum value for dialysis while raising the temperature of the recycled acid to close to the bath temperature. Heat interchange between the contaminated mother liquor leaving dialysis and the refrigerated decrystallized mother liquor precools the contaminated liquor prior to refrigeration and concurrently warms the returning mother liquor to near optimum dialysis temperature.

15 Claims, 2 Drawing Sheets

△ − 30 °C
◊ − 20 °C
+ − 15 °C
□ − 0 °C

METHOD AND APPARATUS FOR RECOVERING ACID AND METAL SALTS FROM PRICKLINING LIQUORS

BACKGROUND OF THE INVENTION

1. Field of the Invention

The present invention relates to a process for recovering acid and metal salts from spent liquors withdrawn from metal pickling baths, and particularly to a process for recycling the acid from the pickling liquors after removing the metal salts.

2. Background Art

Pickling liquors from the primary metal and metal finishing industries comprise a major source of toxic industrial wastes. Pickling is a method used in sheet and wire mills or metal fabricating plants to remove oxide and scale from metal sheet, strip, wire, or parts before another operation, such as galvanizing, electroplating, or painting, by passing the metal products through an acid bath. The spent pickling baths contain residual acid and metal salts of the pickling acid. A significant amount of these wastes comes from pickling baths in the iron and steel industries where the principal acids used are hydrochloric and sulfuric and the resulting metal salts are ferrous chloride and ferrous sulfate, respectively. In a hot-dip galvanizing operation, the pickling bath often is used as well to strip zinc from off-specification products. In this case, the pickling liquor also contains zinc salts of the pickling acid.

In a typical pickling operation for iron or steel, the pickling tank is filled initially with virgin sulfuric acid and water and is maintained at about 150° F. During pickling, the acid reacts with iron oxide scale on the metal normally to form ferrous sulfate heptahydrate ($FeSO_4.7H_2O$). As the operation progresses, the acid strength diminishes (from an initial value of about 12% by weight), and there is a gradual buildup of ferrous sulfate in the tank. Slowdown of pickling rate resulting from acid depletion can be delayed by replenishing the solution with virgin acid as required.

When the iron concentration reaches about 8% by weight, however, ferrous sulfate starts to crystallize in the tank and on the work pieces. In most facilities, therefore, the operation is suspended when the iron concentration reaches 8% by weight and the acid concentration falls to about 7% by weight. The solution in the tank is then drained and replaced by virgin acid and water. Usually the waste acid solution is hauled away for treatment to neutralize the acidity and precipitate the iron as ferrous hydroxide before disposal.

A few facilities have recovered the waste acid by passing the depleted solution through a refrigerated tank to crystallize $FeSO_4.7H_2O$ at temperatures near 32° F. and then have returned the mother liquor to the pickling tank. As shown in FIG. 1, a pickle bath tank 11 receives metal work, denoted by arrow 12, in the form of sheet, strip, wire, or fabricated parts. After being descaled in the bath, the work leaves the tank (arrow 13). When the metal salts produced by the descaling reaction build up to a preselected value, a waste acid solution of metal acid salts is transferred via line 14 to a crystallizer tank 15. Brine or other refrigerant that has been chilled in a refrigeration unit 16 is delivered through line 17 to circulate through heat exchanger coil 18 in the crystallizer and then return to the refrigeration unit through line 19.

A portion of the metal salts crystallizes out of the waste acid solution as its temperature drops. The mixture of crystals and acid mother liquor passes through line 20 to a crystal dewatering unit 21, such as a centrifuge. The mother liquor constituting most of the initial waste acid, but depleted of a substantial amount of metal salts, returns as recovered acid via line 22 to the pickle bath 11, while the crystals are discharged from the dewatering unit via line 23. The heptahydrated ferrous sulfate crystals obtained in this way have a texture and particle size similar to table sugar. The crystals dewater very easily and make a commercially desirable by-product of the pickling operation.

Although acid recovery by refrigerated crystallization eliminates the need to neutralize and dispose of the waste acid and yields a useful by-product, it has at least two disadvantages. The recycled acid has essentially the same reduced concentration as the waste acid solution (about 10% by weight in the case of sulfuric acid pickling); so significant amounts of makeup fresh acid must be added to the pickling tank to bring the acid concentration to its original level. At the same time, some spent acid remains with the ferrous sulfate crystals (about 2–10% by weight of the crystals) so expensive acid-resistant materials must be used for shipping containers and for equipment used for further processing of these crystals.

A recent development is the use of diffusion dialysis to separate the acid from the metal salts in a waste pickling solution. As shown in FIG. 2 and described in a product brochure published by Pure Cycle Environmental Technologies, Inc. of Palmer, Mass. and disclosed in U.S. Pat. No. 5,264,123 issued to Daniel Bailey on Nov. 23, 1993, waste acid contaminated with metal salts from a pickle bath 11 passes through a line 24, pump 25, line 26, filter 27, and line 28 to an acid holding tank 29 in a diffusion dialysis system 30. Acid is metered from the holding tank to flow in contact with one side of ionic exchange membranes in a membrane stack 31. Water delivered through a line 32, filter 33, and line 34 to a fresh water holding tank 35 is metered in a countercurrent fashion on the recovery side of the membranes in membrane stack 31. The majority of the acid migrates through the membranes into the water, leaving contaminants such as metal salts behind. The purified acid returns through line 36 to the pickling tank, while the contaminant-laden spent acid stream goes through line 37 to metal recovery or waste treatment for further processing.

An advantage of this process over refrigerated crystallization is that the acid can be recovered at a concentration of up to 95% of the strength of the waste acid; so when it is recycled to the pickling tank, very little virgin acid makeup is needed. A countervailing disadvantage, however, is that a stream of very dilute acid solution containing metal contaminants is discharged for treatment or recovery.

SUMMARY OF THE INVENTION

The principal object of the present invention is to provide an improved diffusion dialysis acid recovery system for metal descaling facilities that minimizes or eliminates liquid discharge while maximizing acid recovery.

Another object of the invention is to provide such a system that produces by-product metal salt crystals in a non-corrosive form that can be shipped in standard containers.

Still another object of the invention is to provide such an acid recovery system that requires a minimum amount of corrosion resistant piping and equipment.

Yet another object of the invention is to provide an acid recovery system that operates with minimal net energy input.

These and other objects are achieved, according to the present invention, in a process for recovering acid from a metal pickling operation including the steps of treating metal products in an acid bath to remove metal oxides, withdrawing a first solution of metal salts in acid from the pickling operation, delivering the first solution to one side of an anion exchange membrane such that a portion of the acid permeates through the membrane to an opposite recovery side of the membrane, withdrawing a reduced strength acid solution of the metal salts from the one side of the membrane, and returning acid from the recovery side of the membrane to the pickling operation, wherein the improvement comprises:

chilling the reduced strength solution of metal salts to a temperature at which at least a portion of the metal salts crystallize, whereby the remaining liquid constitutes a mother liquor of reduced strength acid depleted of metal salts;

extracting the mother liquor from the crystallized metal salts, the metal salt crystals having a low acidity corresponding to the reduced strength acid of the mother liquor;

delivering the mother liquor to mix with the acid on the recovery side of the membrane for return to the pickling operation; and discharging the crystallized metal salts.

Preferably, the reduced strength acid solution of metal salts withdrawn from the one side of the membrane has a pH value equal to at least about 2, more preferably a pH of about 2.5 or more, so that the discharged metal salt crystals do not require corrosion-resistant containers for storage, shipment, or further processing.

The above objects also are achieved by apparatus according to the present invention in an acid recovery system for a metal treating facility having an acid bath pickling tank, a diffusion dialysis unit having a waste acid inlet, a metal contaminants outlet, a makeup water inlet, and a recovered acid outlet, means for transferring contaminated spent acid from the pickling tank to the waste acid inlet, and means for transferring reconcentrated acid from the recovered acid outlet to the pickling tank, wherein the improvement comprises:

a crystallizer tank;

a conduit connecting the metal contaminants outlet of the diffusion dialysis unit to the crystallizer tank for conveying a stream of dilute mother liquor containing metal contaminants to the crystallizer tank;

a refrigeration device for chilling the contents of the crystallizer tank to crystallize a substantial portion of the metal contaminants in the dilute mother liquor; and a conduit connecting the crystallizer tank to the water inlet of the diffusion dialysis unit for returning purified dilute mother liquor to the diffusion dialysis unit.

In preferred embodiments of the apparatus:

the means for transferring contaminated spent acid from the pickling tank to the waste acid inlet and the means for transferring reconcentrated acid from the recovered acid outlet to the pickling tank include a heat exchanger for transferring heat from the spent acid to the reconcentrated acid;

the conduit connecting the metal contaminants outlet of the diffusion dialysis unit to the crystallizer tank for conveying a stream of dilute mother liquor containing metal contaminants to the crystallizer tank and the conduit connecting the crystallizer tank to the water inlet of the diffusion dialysis unit for returning purified dilute mother liquor to the diffusion dialysis unit include a heat exchanger for transferring heat from the stream of dilute mother liquor containing contaminants to the stream of dilute mother liquor being returned to the diffusion dialysis unit; and the conduit connecting the crystallizer tank to the inlet of the diffusion dialysis unit for conveying the dilute mother liquor to the diffusion dialysis unit includes a crystal dewatering unit for separating the mother liquor from the crystallized metal contaminants.

BRIEF DESCRIPTION OF THE DRAWINGS

In all figures the same reference numeral denotes the same element.

DETAILED DESCRIPTION OF THE PREFERRED EMBODIMENT

Figure 1:
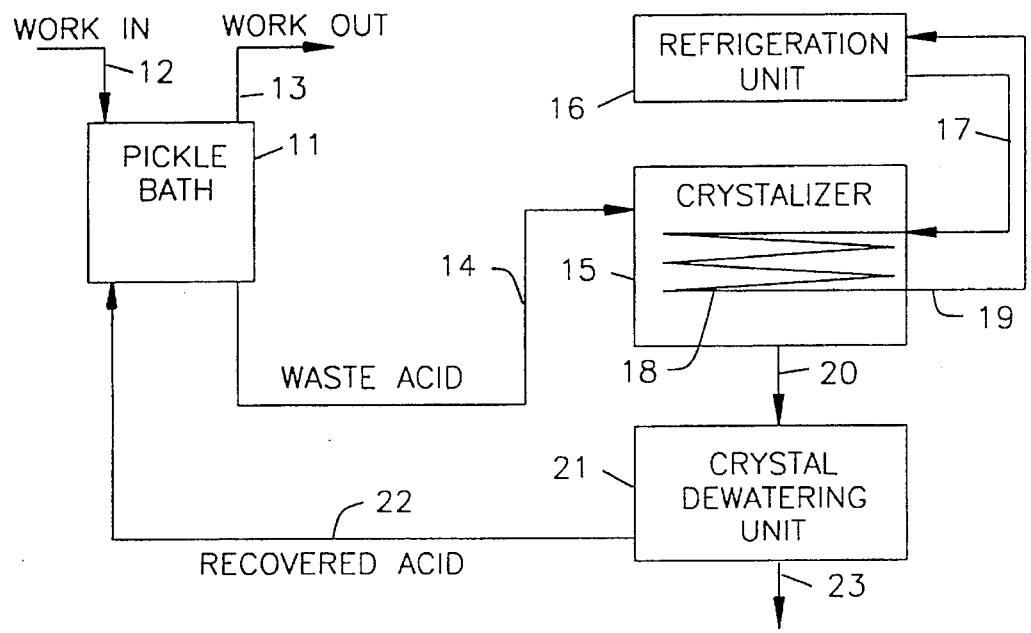
FIG. 1 is a schematic diagram of a prior art refrigerated crystallization acid recovery system for a metal pickling bath.
Figure 2:
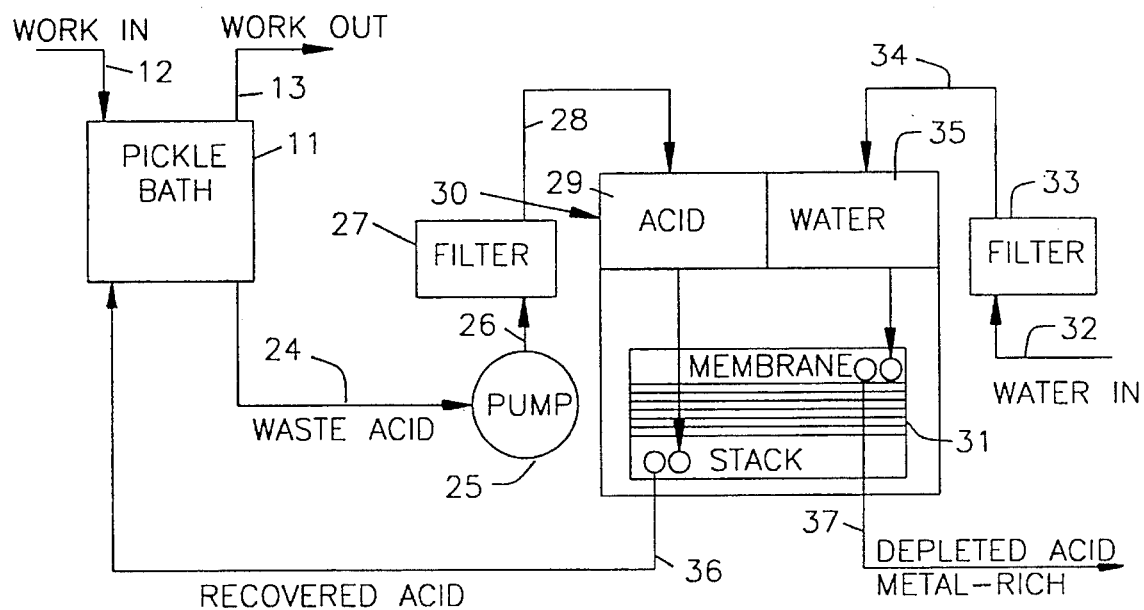
FIG. 2 is a schematic diagram of a prior art diffusion dialysis acid recovery system for a metal pickling bath.
Figure 3:
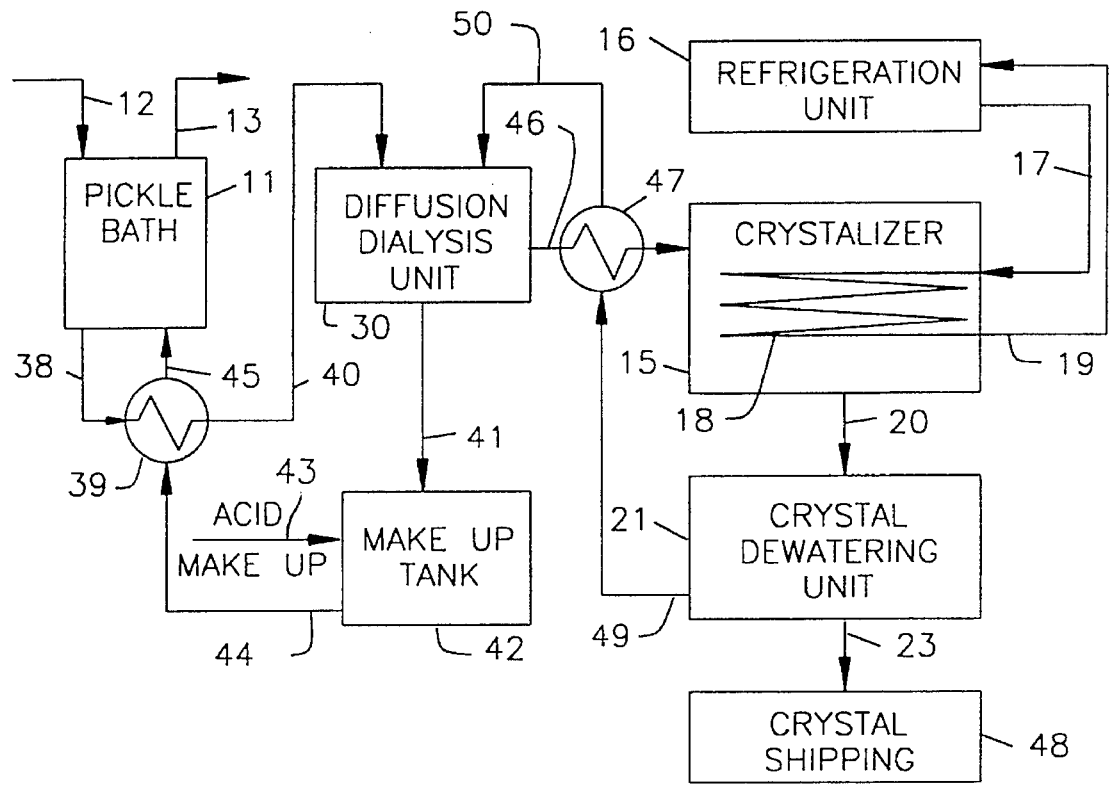
FIG. 3 is a schematic diagram of an improved diffusion dialysis acid recovery system for a metal pickling bath according to the present invention.

FIG. 3 illustrates schematically a pickling bath waste treatment system according to the present invention. A drain line 38 for waste acid contaminated by acid salts of metals treated in the bath connects through one side of a heat exchanger 39 and line 40 to a waste acid inlet side of a diffusion dialysis unit 30, such as the Pure Cycle unit described previously in connection with FIG. 2. A line 41 connects a recovery side of the diffusion dialysis unit with a make-up tank 42 having an acid make-up inlet line 43 and a recycled acid outlet line 44 connecting through another side of the heat exchanger 39 and line 45 back to the pickle bath 11. A depleted acid/metal-rich outlet line 46 from the diffusion dialysis unit connects through one side of a second heat exchanger 47 to a crystallizer tank 15 having a chilling coil 18 supplied with refrigerant circulating from a refrigeration unit 16 through lines 17 and 19. An outlet line 20 then connects the crystallizer 15 to a crystal dewatering unit 21 having a crystal discharge line 23, all as previously described in connection with the prior art metal salt crystallizing system of FIG. 1. The crystal discharge line 23 connects to a shipping container 48 which, contrary to the requirements of the prior art, does not need to be made of acid-resistant material.

Also contrary to the prior art crystallizer system, a mother liquor outlet line 49 connects the dewatering unit 21, through another side of heat exchanger 47 and a line 50, to the water inlet side of the diffusion dialysis unit instead of returning to the pickle bath.

The operation of the system shown in FIG. 3 will be described by means of a process for recovering ferrous sulfate and recycling acid from a sulfuric acid bath for pickling iron or steel. Such a pickling bath is used to remove rust and scale from ferrous wire or metal parts before another operation, such as galvanizing, electroplating, or painting. While the apparatus and process of the invention are applicable to non-ferrous pickling and stripping operations using other acids (e.g., HCl, $HNO_3$, HF, and $H_3PO_4$), ferrous pickling operations are the largest producers of waste acid.

EXAMPLE

To start operation, pickling tank 11 is filled with fresh sulfuric acid at a concentration of about 12% by weight, the acid then being heated to a temperature of about 150° F. As ferrous work is processed through the tank, iron oxide rust and scale react with the acid to form hydrated ferrous sulfate. A stream of depleted acid containing ferrous sulfate is withdrawn from tank 11 through line 38 and enters heat exchanger 39 at temperatures up to 150° F. The stream flow is adjusted to contain about 20% by weight of $FeSO_4$ (7.5% by weight of Fe), which is below the concentration at which the ferrous sulfate will crystallize onto the work. Concurrently, a steady stream of acid is supplied from make-up tank 42 through lines 44 and 45 to maintain the acid concentration in the pickle bath up to about 12% $H_2SO_4$ by weight to keep production at a high and steady level.

After transferring heat to the make-up acid stream in heat exchanger 39, the ferrous sulfate-containing waste acid enters the diffusion dialysis unit at a temperature of about 100° F. to obtain good transfer rate in the dialysis unit. Compared with operation at ambient temperature, using an elevated temperature of around 100° F. both allows the iron to remain in solution and accelerates the acid transfer through the membrane. Within the dialysis unit, acid from the incoming waste stream from the pickling bath diffuses from one side of the membrane or membranes to the other side, which is the recovery side of the unit, leaving the ferrous sulfate on the one side dissolved in a depleted acid having a pH value of preferably between about 2 and about 3, although lower values may be acceptable. This solution of depleted acid/ferrous sulfate leaves the dialysis unit through line 46 and enters the crystallizer 15 after being pre-cooled in heat exchanger 47. The crystallizer is operated at a temperature of approximately 32° F., forming crystals of $FeSO_4.7H_2O$ which are agitated by a conventional stirring mechanism (not shown) to maintain a crystal slurry in the tank 15 that is continuously drained through line 20 into dewatering unit 21.

Figure 4:
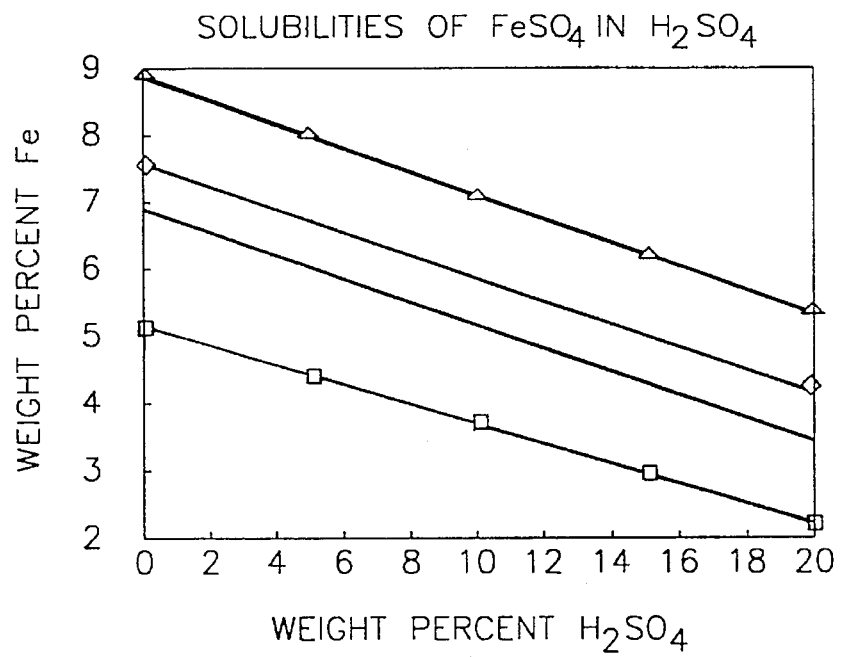
FIG. 4 is a graph of solubilities of $FeSO_4$ in sulfuric acid.

FIG. 4 shows the solubility of $FeSO_4.7H_2O$, expressed as anhydrous $FeSO_4$, as a function of concentration of $H_2SO_4$ at various temperatures. At a pH value of about 2, the concentration of sulfuric acid is about 1% by weight. The intersection of the 0° C. (32° F.) temperature line in FIG. 4 with this concentration value indicates that about 5% Fe (equivalent to 14% percent by weight of $FeSO_4.7H_{20}$) will remain dissolved in the chilled depleted-acid mother liquor after separation from the crystals. This mother liquor is recovered from the dewatering unit through line 49, and after being prewarmed by heat interchange with the metal-rich depleted acid in heat exchanger 47, it is recycled by sending it to the recovery side inlet of the dialysis unit in place of fresh water makeup. Inside the dialysis unit, the depleted acid mother liquor mixes with the more concentrated acid transferred through the membranes; then the mixture passes through line 41 to the make-up tank 42. The acid concentration in the make-up tank is adjusted by adding fresh acid through line 43 before passing through line 44 for prewarming in heat exchanger 39 and final return to the pickle bath through line 45.

By replacing the conventional input of fresh water to the recovery side of the dialysis membranes with depleted acid mother liquor from the dewatering unit, the process of the present invention is able to provide a closed liquid loop acid recovery system, thereby avoiding any corrosive liquid discharge. At the same time it produces an upgraded, non-corrosive ferrous sulfate crystal by-product that can be shipped in standard bulk containers. The overall acid recovery is comparable to that of the prior art Pure Cycle dialysis system that uses fresh water on the recovery side. Although the slight acidity of the returning mother liquor has a tendency to reduce the transfer rate of the acid across the membrane, this is more than compensated for by the substantial increase of transfer rate due to increasing the operating temperature of the dialysis unit above normal ambient temperature.

In comparison with the prior art crystallization systems, the present process returns a larger amount of dissolved ferrous sulfate with the recycled mother liquor, because of the higher solubility of $FeSO_4$ in the depleted acid stream leaving the dialysis unit. The waste acid coming directly from the pickle bath has a concentration of about 10% $H_2SO_4$ by weight. As shown in FIG. 4, the solubility of $FeSO_4$ in this concentration at 0° C. is only about 3.7% iron by weight, instead of the 5% iron that remains in the recycled depleted acid mother liquor in the present invention. This is a very slight disadvantage compared with the advantages that the crystallization apparatus of the present does not need to be made of corrosion resistant materials and the resulting ferrous sulfate crystal is not a corrosive product. By contrast, the crystals of the prior art crystallization process contain 2% or more of the 10% concentration waste pickling liquor, and thus are significantly corrosive.

Although the process of the invention has been described for a ferrous material descaling operation using sulfuric acid, the apparatus and process of the invention are adaptable to pickling operations involving other metals (e.g., aluminum, zinc) and other acids (e.g., hydrochloric, hydrofluoric, nitric, and phosphoric). The crystallized metal salts may be removed from the mother liquor by a screw conveyor or by filtration, as well as by a centrifuge. Other changes may suggest themselves to persons of ordinary skill, and the scope of the invention is intended to be limited only by the breadth of the following claims.

We claim:

1. A process for recovering acid from a metal pickling operation including the steps of treating metal products in an acid bath to remove metal oxides, withdrawing a first solution of metal salts in acid from the pickling operation, delivering the first solution to one side of an anion exchange membrane such that a portion of the acid permeates through the membrane to an opposite recovery side of the membrane, withdrawing a reduced strength acid solution of the metal salts from the one side of the membrane, and returning acid from the recovery side of the membrane to the pickling operation, wherein the improvement comprises:

chilling the reduced strength solution of metal salts which have been withdrawn from said one side of the membrane to a temperature at which a least a portion of the metal salts crystallize, whereby the remaining liquid constitutes a mother liquor of reduced strength acid depleted of metal salts;

extracting the mother liquor from the crystallized metal salts, the metal salt crystals having a low acidity corresponding to the reduced strength acid of the mother liquor;

delivering the mother liquor to mix with the acid on the recovery side of the membrane for return to the pickling operation; and discharging the crystallized metal salts.

2. The process of claim 1 wherein the reduced strength acid solution of metal salts withdrawn from the one side of the membrane has a pH value equal to at least about 2.

3. The process of claim 2 wherein the reduced strength acid solution of metal salts withdrawn from the one side of the membrane has a pH value equal to or greater than 2.5.

4. The process of claim 1 wherein the acid in the pickling operation comprises sulfuric acid, and the metal salts comprise ferrous sulfate.

5. The process of claim 4 wherein the temperature of the chilled reduced strength acid solution of metal salts is approximately 32° F.

6. The process of claim 5 wherein the mother liquor delivered to the recovery side of the membrane contains ferrous sulfate in a concentration of approximately 14% by weight.

7. The process of claim 1 wherein the improvement further comprises:

passing the first solution of metal salts in acid withdrawn from the pickling operation in heat exchange relation with the acid from the recovery side of the membrane before delivering the first solution to the one side of the anion exchange membrane and returning the recovery side acid to the pickling operation.

8. The process of claim 1 or 7 wherein the improvement further comprises:

passing the reduced strength acid solution of the metal salts withdrawn from the one side of the membrane in heat exchange relation with the mother liquor extracted from the crystallized metal salts before chilling the reduced strength acid solution and delivering the mother liquor to the recovery side of the membrane.

9. An acid recovery system for a metal treating facility having an acid bath pickling tank, a diffusion dialysis unit having a waste acid inlet, a metal contaminants outlet, a water inlet, and a recovered acid outlet, means for transferring contaminated spent acid from the pickling tank to the waste acid inlet, and means for transferring purified acid from the recovered acid outlet to the pickling tank, wherein the improvement comprises:

a crystallizer tank;

a conduit connecting the metal contaminants outlet of the diffusion dialysis unit to the crystallizer tank for conveying a stream of dilute mother liquor containing metal contaminants to the crystallizer tank;

a refrigeration device for chilling the contents of the crystallizer tank to crystallize a substantial portion of the metal contaminants in the dilute mother liquor; and a conduit connecting the crystallizer tank to the water inlet of the diffusion dialysis unit for returning purified dilute mother liquor to the diffusion dialysis unit.

10. The apparatus of claim 9 wherein the means for transferring contaminated spent acid from the pickling tank to the waste acid inlet and the means for transferring purified acid from the recovered acid outlet to the pickling tank include a heat exchanger for transferring heat from the spent acid to the purified acid.

11. The apparatus of claim 9 or 10 wherein the conduit connecting the metal contaminants outlet of the diffusion dialysis unit to the crystallizer tank for conveying a stream of dilute mother liquor containing metal contaminants to the crystallizer tank and the conduit connecting the crystallizer tank to the water inlet of the diffusion dialysis unit for returning purified dilute mother liquor to the diffusion dialysis unit include a heat exchanger for transferring heat from the stream of dilute mother liquor containing contaminants to the stream of dilute mother liquor being returned to the diffusion dialysis unit.

12. The apparatus of claim 9 wherein the conduit connecting the crystallizer tank to the inlet of the diffusion dialysis unit for conveying the dilute mother liquor to the diffusion dialysis unit includes a crystal dewatering unit for separating the mother liquor from the crystallized metal contaminants.

13. The apparatus of claim 12 wherein the crystal dewatering unit comprises a centrifuge.

14. The apparatus of claim 12 wherein the crystal dewatering unit comprises a screw conveyor.

15. The apparatus of claim 9 wherein the conduit connecting the metal contaminants outlet of the diffusion dialysis unit to the crystallizer tank, the crystallizer tank, and the conduit connecting the crystallizer tank to the water inlet of the diffusion dialysis unit are constructed of non-corrosion resistant material.

\* \* \* \* \*

UNITED STATES PATENT AND TRADEMARK OFFICE
CERTIFICATE OF CORRECTION

PATENT NO. : 5,562,828
DATED : October 8, 1996
INVENTOR(S) : OLSEN et al.

It is certified that error appears in the above-indentified patent and that said Letters Patent is hereby corrected as shown below:

On the title page, item [54] and column 1, line 3, change "PRICKLINING" to --PICKLING--.

Signed and Sealed this

Twenty-first Day of January, 1997

Attest:

BRUCE LEHMAN

*Attesting Officer*  *Commissioner of Patents and Trademarks*